United States Patent [19]

Park

[11] Patent Number: 4,938,305

[45] Date of Patent: Jul. 3, 1990

[54] AUTOMATIC DIRECTION CHANGING APPARATUS FOR VEHICLE

[76] Inventor: Heung J. Park, 410-4, Beon 1-Dong, Dobong-Ku, Seoul, Rep. of Korea, 132-061

[21] Appl. No.: 275,318

[22] Filed: Nov. 23, 1988

[30] Foreign Application Priority Data

Nov. 24, 1987 [KR] Rep. of Korea ............... 20343/1987

[51] Int. Cl.$^5$ ............................................. B66F 7/24
[52] U.S. Cl. ................................. 180/199; 180/8.1; 180/8.5; 254/93 HP
[58] Field of Search ................... 180/199, 8.1, 8.5; 280/638; 254/93 HP

[56] References Cited

U.S. PATENT DOCUMENTS

| | | | |
|---|---|---|---|
| 1,627,249 | 5/1927 | Page | 180/8.5 |
| 1,879,446 | 9/1932 | Page | 180/8.5 |
| 4,336,889 | 6/1982 | McGrew | 280/638 X |
| 4,542,882 | 9/1985 | Choe | 254/93 HP |
| 4,817,412 | 4/1989 | Hinson | 254/93 HP X |

FOREIGN PATENT DOCUMENTS

| | | | |
|---|---|---|---|
| 49561 | 4/1977 | Japan | 180/8.5 |
| 1211111 | 2/1986 | U.S.S.R. | 180/8.5 |

*Primary Examiner*—Mitchell J. Hill

*Attorney, Agent, or Firm*—Darby & Darby

[57] ABSTRACT

An automatic direction changing apparatus for a vehicle in which an air tube is mounted at the bottom of the vehicle body and the air tube is expanded to lift the vehicle to a predetermined height from the ground surface and the vehicle body can be moved right or left. The vehicle body when lifted can be turned with any rotational angle clockwise or counterclockwise, so that the vehicle is capable of moving or turning on a narrow road, in a blind alley, and in a crowded parking lot. It also allows the vehicle to be pulled out of a muddy road if it is stuck and can be utilized to lift the vehicle for repairs or to replace the tires. The apparatus is comprised of means for moving to the right or left, means for turning clockwise or counterclockwise, and lifting up means for lifting the vehicle body to a predetermined height from the ground surface. The moving means comprises guide rails, guide rollers, a motor capable of producing forward and reverse movement, worm and worm gear, large and small gears for speed reduction and a rack. The turning means includes a motor, worm and worm gear, large and small gears for speed reduction, circular internal teeth gear, supporting rollers, and a hollow shaft. The lifting means comprises an air tube, supporting plate, and a hose and valve assembly.

5 Claims, 7 Drawing Sheets

AUTOMATIC DIRECTION CHANGING APPARATUS FOR VEHICLE

BACKGROUND OF THE INVENTION

The present invention relates to an automatic direction changing apparatus, and more particularly to an automatic direction changing apparatus which renders it possible to turn by any directional angle to the right or left or to move to the right or left a parked or stopped vehicle, so that the direction of the vehicle can be readily changed in a narrow space such as an alley or when a vehicle is sandwiched between two other vehicles.

Recently, the traffic problem and the parking problem in downtown areas due to the increase in the number of vehicles is becoming increasingly serious day by day. Particularly, in the case where a vehicle has to be drawn out from being sandwiched between the front and back in a narrow space such as a parking lot or in the case when it is desired to turn the vehicle on a narrow road or at a blind alley, an apparatus that can turn a vehicle with minimum rotational radius is desired.

A direction changing apparatus utilizing oil pressure is disclosed in Korean Pat. Publication No. 88-5162 (Apr. 15, 1988). This patent shows a structure in which oil pressure cylinders connected with an oil pressure pump are respectively mounted to both front and rear portions and to a side portion of the bottom of a vehicle. The reduction gear and rollers are respectively attached at the bottom end of the piston of said oil pressure cylinder, in which the piston is lifted or dropped by utilizing the oil pressure by the oil pressure pump, and the rollers at the end of the piston are turned by motors respectively arranged separately, so that turning to the desired direction, and right and left movement can be executed. However, the apparatus is composed of a relatively complicated structure such as an oil pressure pump and the motor for driving it, three cylinders and pistons, and the motors for driving the rollers attached respectively at each end of the front, rear and side pistons. Further, it has the problems that the rollers end up sticking on a road surface which is not very hard because the rollers for directional change are of relatively small size, therefore making the actual direction change operation difficult. There has also been the problem that when the vehicle is turned, since the rotational radius in accordance with the turning of a vehicle begins to exceed the whole length of the vehicle, the space required for turning becomes broader.

SUMMARY OF THE INVENTION

Therefore, a primary object of the present invention is to provide a direction changing apparatus of entirely novel structure which does not suffer from the various problems of conventional apparatus as described above.

Another object of the present invention is to provide an automatic direction changing apparatus in which an air tube is arranged at the bottom of a vehicle and said air tube is made to expand so that the vehicle body can be moved to the right or left when the vehicle body is lifted from the ground surface to a predetermined height.

A further object of the present invention is to provide an automatic direction changing apparatus in which a vehicle body lifted up from the ground surface to a predetermined height can turn with any rotational angle of the right or left within an overall length of a vehicle body.

Still another object of the present invention is to provide an automatic direction changing apparatus in which the lifting up of a vehicle is made possible without regard to the condition of the road surface by utilizing the air tube so that the vehicle body can be pulled out even if the wheels of the vehicle are stuck in a muddy road or the like.

A still further object of the present invention is to provide an automatic direction changing apparatus which can also function as a jack in case of changing a tire or repairing the vehicle by lifting the vehicle body by utilizing the air tube.

An automatic direction changing apparatus of the present invention which has the objects as above is generally composed of right and left movement means, turning means and lifting means for lifting the vehicle body to the predetermined height from the ground surface.

Aforesaid right and left movement means has guide rails which protrude downwardly at both sides of a bottom plate of the vehicle or a bottom surface of a separate cover plate, a plurality of guide rollers which are fixed at a supporting plate of the lower side of the cover plate and mesh with said guide rails, a motor for moving which is fixed on the upper surface of said supporting plate and forward and reverse turning is possible, a worm gear attached to a rotary shaft of said motor, large and small gears for speed reduction which are meshed with said worm gear, and a rack which is fixed in the direction of the width of the vehicle at the bottom of said cover plate and meshed with the small gear.

The aforesaid turning means has a motor for turning fixed on the upper surface of said supporting plate, a worm gear fixed to the rotating shaft of said motor, large and small gears for speed reduction meshed with said worm, a circular internal gear which is fixed at the central portion of the lower side circular base plate of said supporting plate and meshed with the small gear of said speed reduction gears, supporting rollers which are fixed on the bottom in four areas of said supporting plate and are supported on the upper plate of the circular base plate, and a hollow shaft which is fixed at the central portion of said supporting plate and whose lower end is supported with a bearing at the central portion of said circular base plate.

The aforesaid lift up means has an air tube mounted at the bottom of said circular base plate, a bottom plate which is mounted at the bottom of said air tube and connected with springs between said circular base plate thereof, and a valve assembly and hoses for blowing in and discharging out the air from and to said air tube.

According to another embodiment of the present invention, the rack and pinion of said right and left movement means can be displaced with bevel gears and screwed bar.

An automatic direction changing apparatus of the present invention structured as hereinabove can have a concaved groove formed at the bottom of the vehicle with a predetermined depth so that almost all components except the lift up means can fit within said concaved groove, and also can be arranged to fix simply at the bottom plate of the vehicle. However in order to prevent reduction of the height from the ground surface to the bottom of vehicle due to the mounting of this apparatus, it is preferred that the concaved groove is formed in the direction of the width of the vehicle and all the mechanical components are arranged within said concaved groove. In addition, it is disposed in the center of gravity in order to prevent the vehicle from leaning frontwardly or rearwardly when the vehicle is lifted up.

The objects of the present invention as discussed above, and other objects, features and advantages of the present invention will be more apparent by considering the following description which is explained with an embodiment with reference to the accompanying drawings.

DETAILED DESCRIPTION OF THE INVENTION

Figure 1:
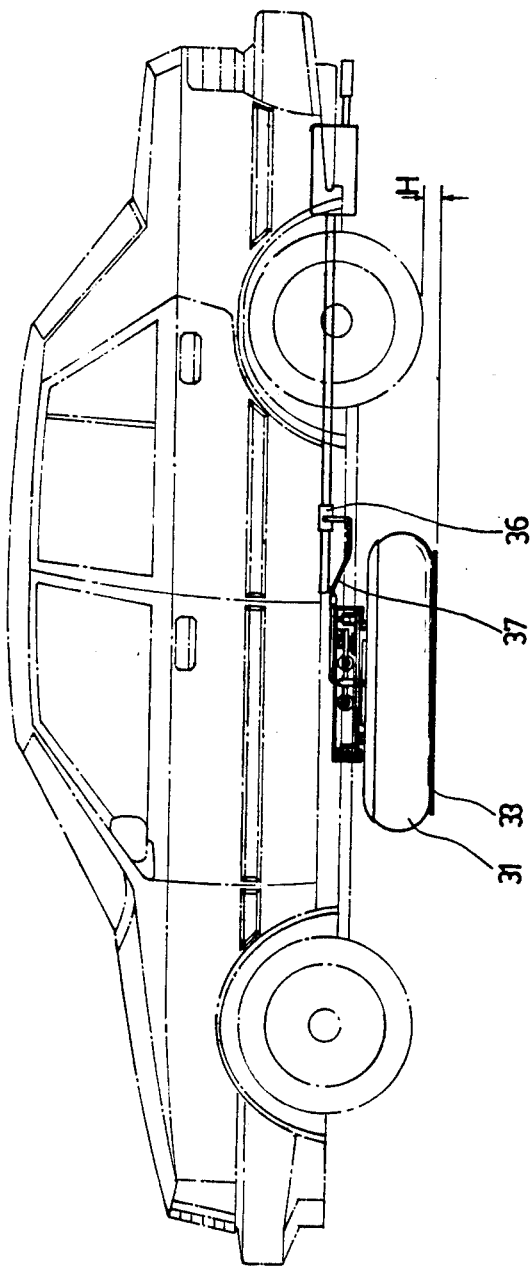
FIG. 1 is a schematic side view illustrating an automatic direction changing apparatus according to an embodiment of the present invention.
Figure 2:
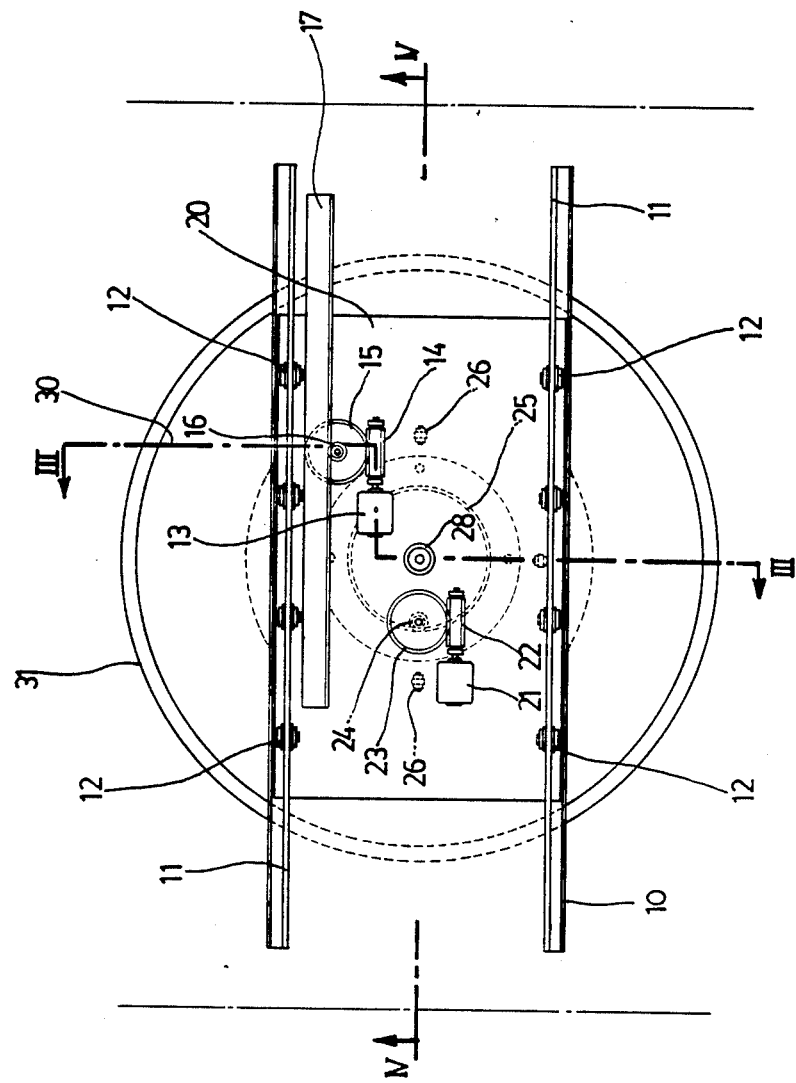
FIG. 2 is a schematic plan view in which the cover plate is removed to show the structure of an automatic direction changing apparatus according to an embodiment of the present invention.

FIG. 1 is a schematic side view illustrating a vehicle lifted to a predetermined height H from the ground surface according to the present invention. As shown in the drawing, the automatic direction changing apparatus of the present invention is located slightly forward of the center of the bottom of a vehicle in order to set the apparatus at the center of gravity because the center of gravity of a vehicle is slightly forward of its dimensional center, due to the weight of the engine. In this figure, the height H is approximately 15 cm however the appropriate height can be obtained by selecting the air tube of pertinent magnitude in accordance with the kind or magnitude of the vehicle.

Hereinafter the structure of an automatic direction changing apparatus of the present invention will be explained in accordance with FIGS. 2 to 5.

As mentioned hereinabove, the automatic direction changing apparatus of the present invention is composed of right and left movement means, turning means and lift up means.

The aforesaid right and left movement means comprise guide rails 11, 11 which are parallel and protrude downwardly a predetermined distance at both sides of the bottom surface of a rectangularly shaped cover plate 10, a plurality of rollers 12, 12 which are fixed to both sides of a supporting plate 20 at the lower side of cover plate 10 and meshed with said guide rails 11, 11, a motor 13 fixed at the upper surface of said supporting plate 20 and producing forward and reverse revolution, a worm gear 14 mounted to the axle shaft of said motor 13, large and small gears 15, 16 for speed reduction which are meshed with said worm gear 14 and reduce the speed of rotationary power of the motor 13, and a rack 17 which is fixed at a side of the bottom surface of said cover plate 10 in a direction of the width of vehicle body and then meshed with said small gear, i.e., pinion 16. Both edge portions of cover plate 10 are bent downwardly and the lower end portions are bent inwardly. Separate contact members 18, 19 are frictionally interposed at the end portions on both side portions of said supporting plate 20.

Aforesaid turning means comprises a motor 21 fixed at the lower surface of said supporting plate 20 for producing forward and reverse revolution, a worm gear 22 fixed to a rotary shaft of said motor 21, large and small gears 23, 24 for speed reduction meshed with said worm gear 22, a circular internal gear 25 fixed at the central portion of a lower surface of a lower circular base plate 30 of said supporting plate 20 and then meshed with the small gear, i.e., pinion 24 of said reduction gears, supporting rollers 26, 26 which are mounted at four locations of the bottom surface of said supporting plate 20 to thereby support at the upper surface of the circular base plate 30 said right and left movement means and the turning means, and a hollow shaft 28 which is fixed at the central portion of said supporting plate 20 and whose lower end portion is supported by a bearing 27 at the central portion of said circular plate 30. Aforesaid pinion 24 passes downwardly through the supporting plate 20 with the shaft 23' of the large gear 23 thereby meshed with the internal gear 25 at the lower side of the supporting plate 20.

Further, the lift up means for lifting up the vehicle body from the ground surface to a predetermined height comprises an air tube 31 mounted at the bottom surface of said circular base plate 30, a bottom plate 33 which is fixed at the bottom surface of said air tube 31 and connected with tensile springs 32, 32 to circular base plate 30, a flexible hose 34 fixed to said air tube 31, and a flexible hose 37. One end of hose 37 is connected to said hose 34 by a ring coupling means 35 and the other end is connected to an air supply source 36. The peripheral portion of said circular base plate 30 is bent downwardly with a slight slant so that the air tube 31 can be surrounded within the interior upon constriction. Said air tube is connected with a resilient band 38 in its interior, as shown by the line in FIGS. 3 and 4. Upon constriction it is structured so as not to pushed out toward the exterior of the circular base plate 30.

Figure 8:
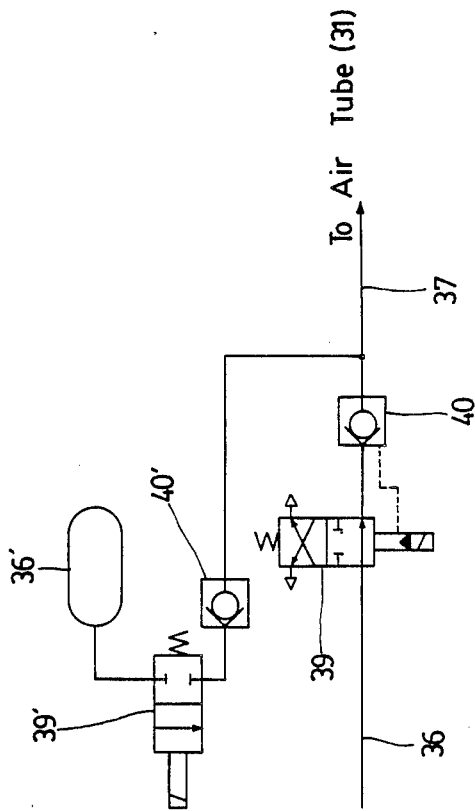
FIG. 8 is a pipeline laying diagram which is applied to an automatic direction changing apparatus of the present invention.

Aforesaid air supply source 36 either can use the exhaust gas or, as shown in FIG. 8, the separate compressed air tank 36' can be utilized. Said ring coupling means 35 is connected between the hose 34 which is fixed to the air tube 31 and the connecting hose 37 which is connected with the air supply sources 36, 36' so that the hoses 34, 37 are not twisted when the vehicle is turned.

The detailed connecting structure of said connecting hose 37 and the air supply sources 36, 36' will be explained with reference to FIG. 8.

That is to say, in case where the air supply source is the exhaust gas, an electronic three-way valve 39 and a check valve 40 are interposed between the exhaust pipe of the vehicle and the connecting hose 37.

Aforesaid three-way valve 39 is connected with a driving switch (not shown) arranged at a driver's seat and in accordance to the handling of said switch, can either charge into the air tube 31 by cutting off the exhaust gas to be discharged into the ambient atmosphere, or discharge into the ambient atmosphere by cutting off the charge into the air tube 31. Aforesaid check valve 40 is structured to be able to open in accordance to the signal from said three-way valve 39 in order to discharge air within the air tube 31 into the ambient atmosphere via the three-way valve 39 through the check valve 40.

In addition, in case where the air supply source is the separate compressed air tank 36', similarly as above, an opening and closing valve 39' and the check valve 40' is interposed therebetween so that the air within the compressed air tank 36' can be supplied into the air tube 31 through the opening and closing valve 39' and the check valve 40' by the handling of the switch. However in case it is desired to discharge the air within the air tube 31 the above mentioned three-way valve 39 and check valve 40 may be utilized.

Figure 7:
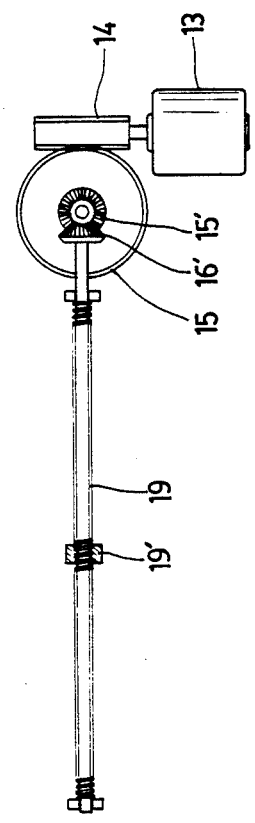
FIG. 7 is a schematic explanatory diagram which shows a partial power transmission mechanism of the right and left movement means according to another embodiment of the present invention.

On the other hand, FIG. 7 shows a partial power transmission mechanism of the right and left movement means according to the another embodiment of the present invention, in which the power of the motor 13 is transferred to a bevel gear 15' through the large gear 15 for speed reduction and through worm 14. The bevel gear 15' is meshed with a bevel gear 16' fixed to the end portion of a screwed bar 19. A nut 19', fixed to the bottom surface of said cover plate 10, is locked to the screwed bar 19 so that the right and left movement of the vehicle occurs in accordance with the direction of revolution of the screwed bar 19.

The right and left movement and turning movement and their operation and effects as described hereinabove will be explained in detail below.

When the vehicle is moved or turned, when the air is charged into the air tube 31 from the air supply source 36 or 36' by handling the driving switch arranged at the predetermined location of a driver's seat, the air tube 31 is expanded and as shown in FIG. 1 the vehicle body is lifted up from the ground surface to a predetermined height H. When the motor 13 is driven by the handling of the switch at this state, the driving power is transferred through the worm 14 fixed to the rotary shaft and reduced with the predetermined speed ratio at the large and small gears 15, 16 for speed reduction. As the small gear 16 is rotated, the rack 17 meshed therewith is moved. Since the rack 17 is fixed at the cover plate 10 mounted to the bottom plate of the vehicle body, the direction of movement can be changed to the right or left in accordance to the rotational direction of the motor 13.

When the vehicle body is moved to the right or left to a predetermined distance, the guide rails 11, 11 of the bottom surface of cover plate 10 fixed at the bottom plate of vehicle body are supported and guided by the guide rollers 12, 12 fixed at the supporting plate 20 and the supporting plate 20 and the parts fixed thereto are stopped. At this moment, when the vehicle body is moved by the predetermined distance, the vehicle body is leaned to said moved direction and then the wheel of the moved side is brought into contact with the ground surface. However, when the wheel is contacted to the ground surface, the movement of the vehicle is possible. In addition, theoretically the distance that a vehicle can be moved to the right or left at one time, corresponds to the overall length of the rack 17. However, since the length of the rack 17 does not exceed ⅔ of the overall width of the vehicle body, in order to move to the right or left the distance corresponding to the overall width of the vehicle body, the movement action needs to occur about two times.

Figure 5:
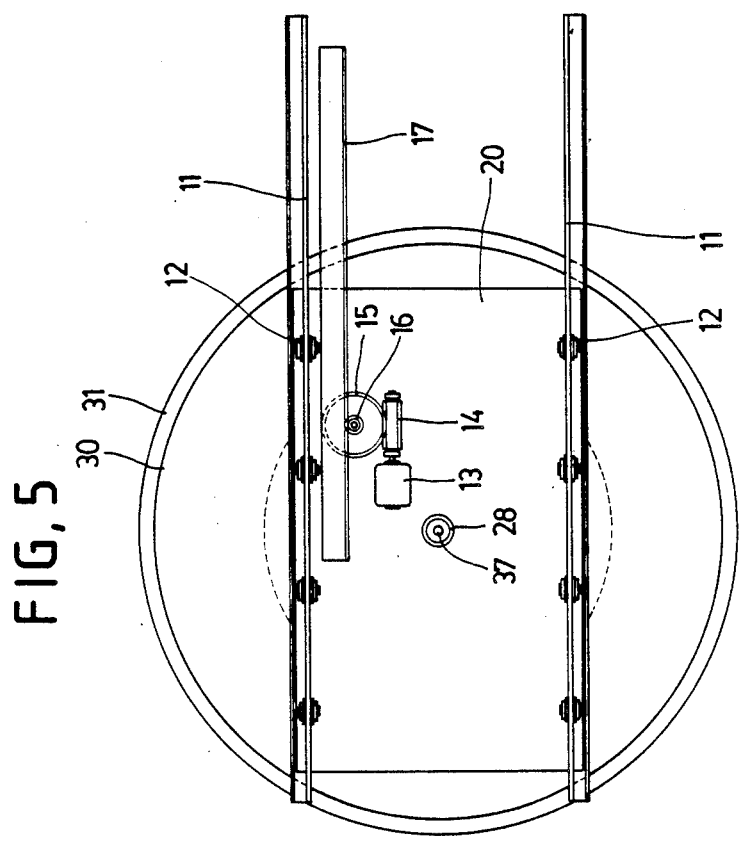
FIG. 5 is schematic explanatory diagram in which the vehicle is moved to the right side a predetermined distance by the movement means of an automatic direction changing apparatus according to an embodiment of the present invention.

In FIG. 5, though it is shown that a vehicle body is moved to the right side by a predetermined distance, when the motor 13 is made to rotate in the other direction, the movement to the left side of the vehicle body is possible. Moreover, in case where the vehicle body is moved to the right or left, in order to control said movement distance, a detecting sensor can also be attached to the rack gear 17 or at a predetermined location of the cover plate 11.

Figure 6:
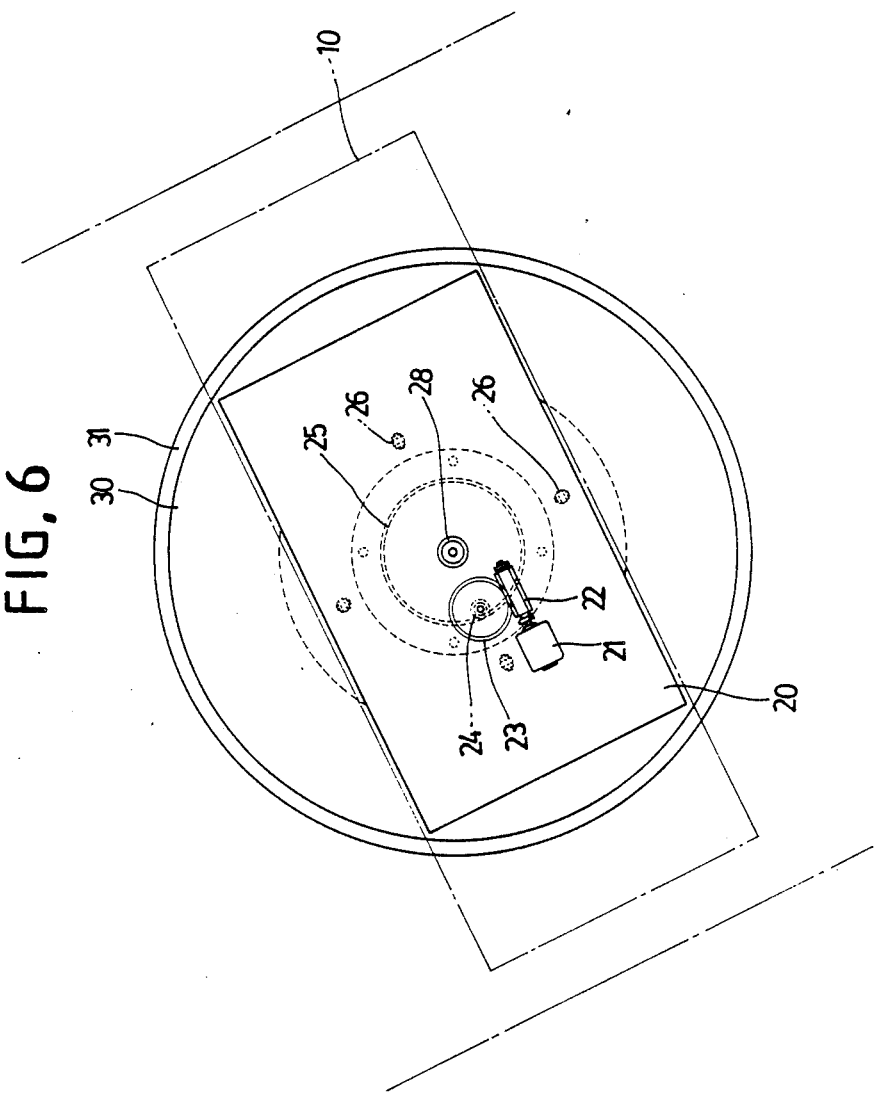
FIG. 6 is a schematic explanatory diagram showing the vehicle turned toward the left side at a predetermined rotational angle by the turning means of an automatic direction changing apparatus according to an embodiment of the present invention.

On the other hand, FIG. 6 shows the vehicle body turned to the right side by a predetermined rotational angle. The motor 21 is driven by the handling of the switch and the air tube 31 is made to expand and then the vehicle body is lifted up to the predetermined height H from the ground surface. Said rotational power is transferred to the pinion 24 through the worm 22 and the large gear 23 for speed reduction, and then the pinion 24 starts to rotate followed by the internal gear 25 meshed therewith. At this moment, the supporting rollers 26, 26 fixed to the bottom surface of the supporting plate 20 start to rotate integrally with the motor 21, motor 13, the cover plate 10, and the like supported to the upper surface of the circular base plate 30, and accordingly the vehicle body supported on the cover plate 10 rotates together with them.

Figure 3:
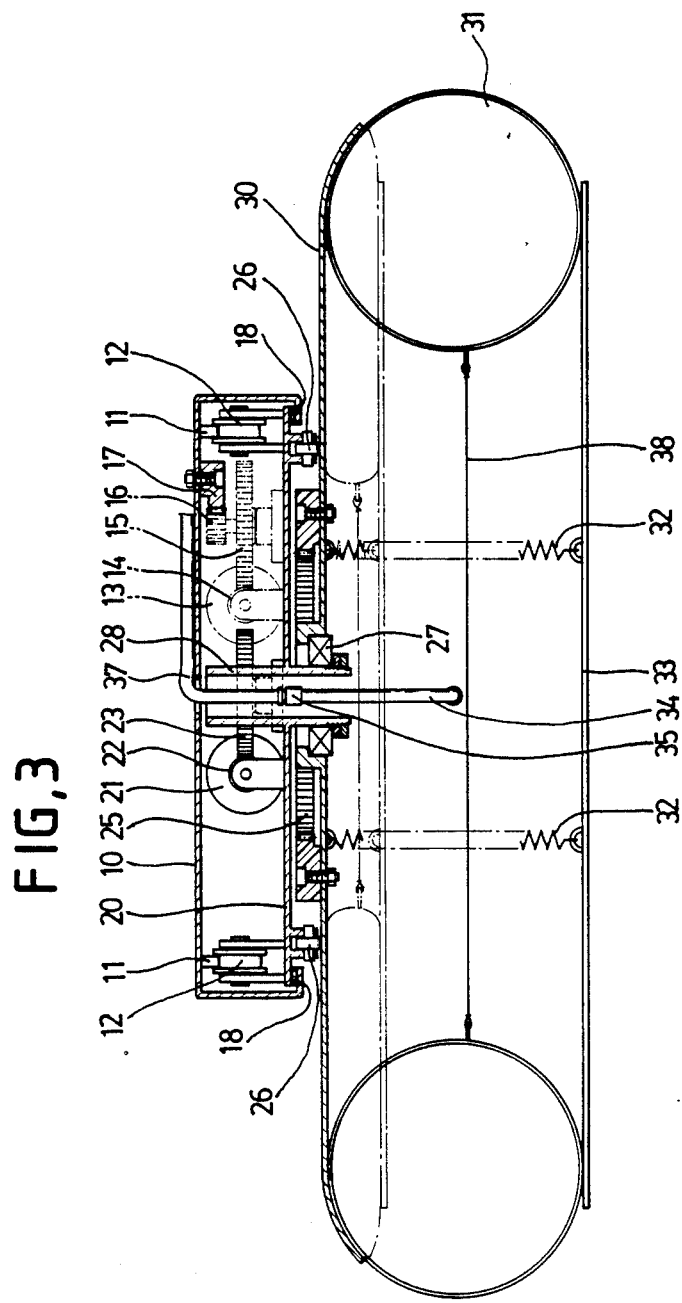
FIG. 3 is an enlarged cross sectional view taken along lines III—III in FIG. 2.
Figure 4:
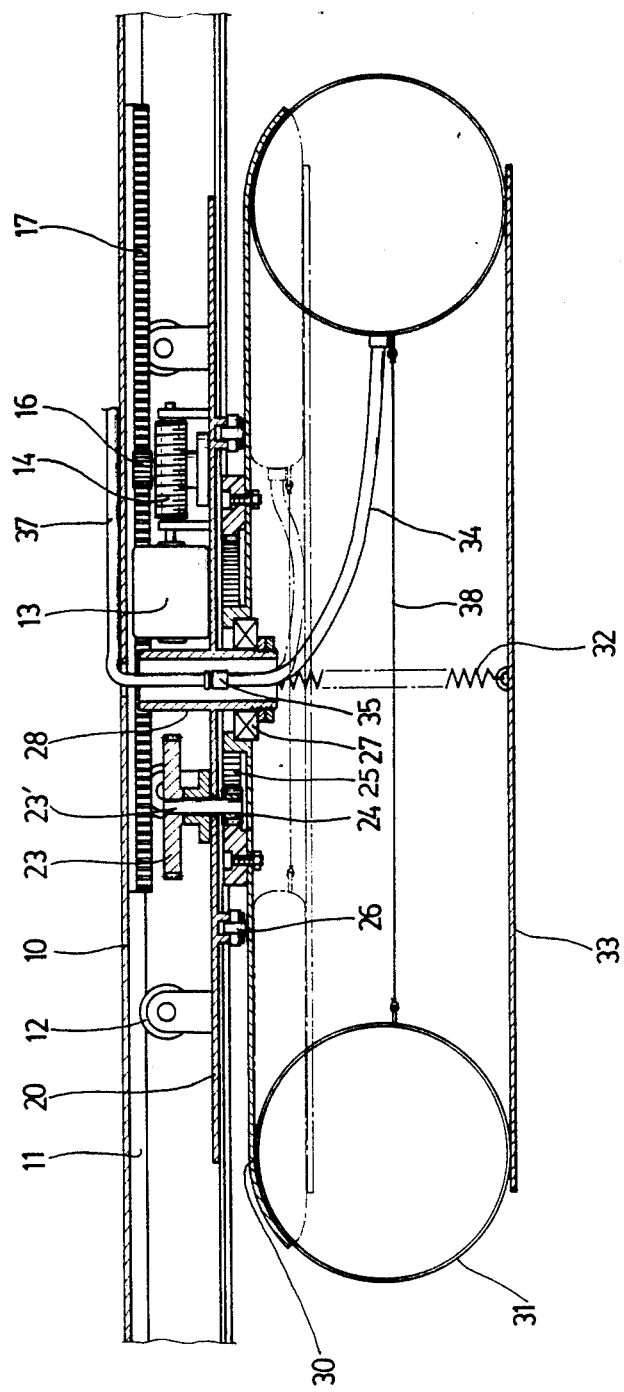
FIG. 4 is an enlarged cross sectional view taken along lines IV—IV in FIG. 2.

After the desired direction change is accomplished by the right or left movement or the turning operation of the vehicle as described hereinbefore, a signal is applied to the three-way valve 39 by the handling of the switch, and the air within the air tube 31 is discharged to the ambient atmosphere via the check valve 40 and then through the three-way valve 39. At this moment, the air tube 31 sticks to the bottom surface of the circular base plate 30, as shown in FIGS. 3 and 4, by the resilient force of the springs 32, 32 connected between the circular base plate 30 and the bottom plate 33 and the resilient bands 38, 38 connected to the inside of the air tube 31.

An automatic direction changing apparatus according to the present invention as described in detail hereinabove has the advantages that when the air tube is expanded and the vehicle body is lifted up, it is possible either to move the vehicle to the right or left or to rotate, thereby the direction change of the vehicle can be accomplished within the minimum space. Since the vehicle body is lifted up by being supported in a relatively broad area, even in case where the wheel of vehicle is stuck such as in a muddy road, the vehicle body can be pulled out readily.

I claim:
1. An automatic direction changing apparatus for a vehicle which comprises:
   movement means which includes a cover plate (10) of rectangular shape mounted at a bottom portion of the vehicle, guide rails (11), (11) protruding at both sides of a bottom surface of said cover plate (10), a supporting plate (20) formed at a lower side of said cover plate (10), guide rollers (12), (12) fixed at an upper surface of the supporting plate (20), said guide rollers (12), (12) are meshed with said guide rails (11), (11), a first motor (13) fixed to the upper surface of said supporting plate (20) for producing forward and reverse revolution, a first worm gear (14) fixed to a rotary shaft of said first motor (13), a large and small gear (15), (16) meshed with said first worm gear (14) to reduce the speed of revolution of said motor (13), and a rack (17) which is fixed at a side of the bottom surface of said cover plate (10) and is meshed with said small gear (16);

turning means which includes a second motor (21) fixed at the upper surface of said supporting plate (20) for producing forward and reverse revolution, a second worm gear (22) fixed to a rotary shaft of said second motor (21), a large and small gear (23), (24) for speed reduction meshed with said second worm gear (22), a circular base plate (30), a circular internal tooth gear (25) fixed at a central portion of an upper surface of said circular base plate (30) and meshed with said small gear (24), a pair of supporting rollers (26), (26) fixed at a bottom surface of said supporting plate (20) to support the supporting plate (20), and a hollow shaft (28) fixed at a central portion of said supporting plate (20) and a lower end of said shaft being supported by a bearing (27) at the central portion of said circular base plate (30);

lift-up means for lifting up the vehicle which includes an air tube (31) fixed at a bottom surface of said circular base plate (30), a bottom plate (33) fixed at a bottom surface of said air tube (31) and connected to said circular base plate (30) with a pair of tensile springs (32), (32), a hose (34) fixed to said air tube (31) and passing through said hollow shaft (28), and a flexible hose (37) having a first end connected to said hose (34) with a ring coupling means (35) and a second end connected to an air supply source.

2. An automatic direction changing apparatus for a vehicle according to claim 1, wherein said movement means includes bevel gears (15'), (16') which transfer the rotation force of said first motor of said movement means, a threaded bar (19) which is connected to the bevel gear (16'), and a nut (19') attached to the bottom surface of the cover plate (10) and meshed with said threaded bar (19).

3. An automatic direction changing apparatus for vehicle according to claim 1, wherein said air supply source is the exhaust gas of a vehicle.

4. An automatic direction changing apparatus for vehicle according to claim 1, wherein said air supply source is the separate compressed air tank.

5. An automatic direction changing apparatus for a vehicle according to claim 1, further comprising a three-way valve (39) and a check valve (40) between said hose (37) and said air supply source.

* * * * *